UNITED STATES PATENT OFFICE.

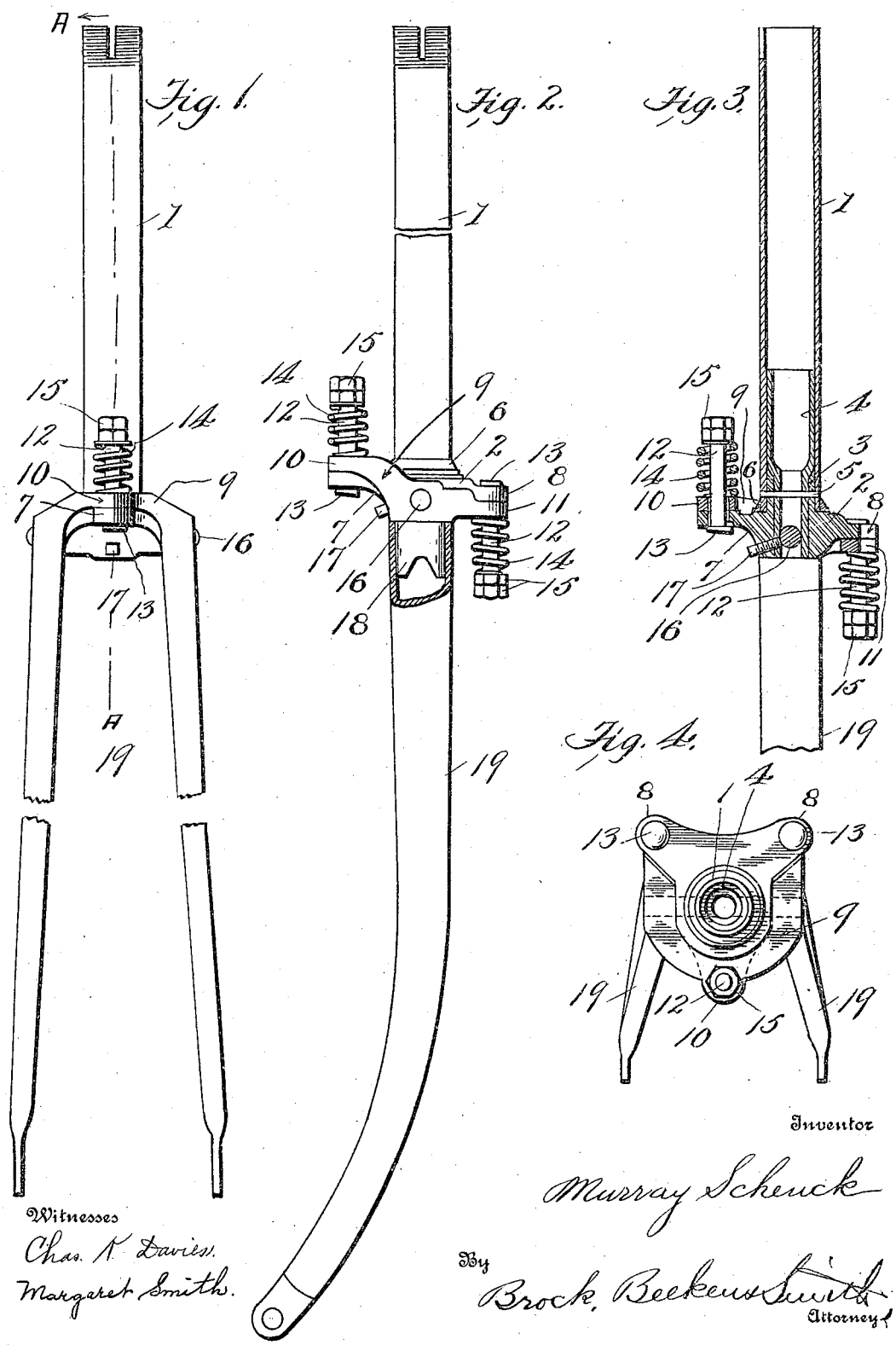
M. SCHENCK.
SPRING FORK.
APPLICATION FILED MAR. 18, 1907.
948,743.
Patented Feb. 8, 1910.

MURRAY SCHENCK, OF MIDDLETOWN, OHIO, ASSIGNOR TO THE MIAMI CYCLE & MANUFACTURING COMPANY, OF MIDDLETOWN, OHIO, A CORPORATION OF OHIO.

SPRING-FORK.

948,743.

Specification of Letters Patent.  Patented Feb. 8, 1910.

Application filed March 18, 1907. Serial No. 363,136.

*To all whom it may concern:*

Be it known that I, MURRAY SCHENCK, a citizen of the United States, and resident of Middletown, in the county of Butler and State of Ohio, have invented a new and useful Spring-Fork, of which the following is a specification.

My invention relates to spring forks for bicycles, tricycles, and other wheeled vehicles.

A principal object of my invention is to provide a fork which has a very flexible action and yet in which the springs are amply strong and in which there are a number of springs, preferably more than two.

A further object is to construct such a fork so that in case of breakage of one or more of the springs there is no liability of serious accident.

Further objects are to improve this class of construction in general.

The characteristics and advantages of the invention are hereinafter more fully described in connection with a detailed description of the accompanying drawing which illustrates an exemplifying structure embodying the invention.

In the drawing Figure 1 is a front view of a steering stem and fork; Fig. 2, a side view, partly in section; Fig. 3, a vertical section on line A—A, of Fig. 4; and Fig. 4, a plan view.

Reference numeral 1 designates the tubular stem; 2, a yoke or bridge piece rigid with the stem having a tubular lug 3 fitting within the stem; 4, a thimble or reinforcement fitting within the stem and lug 3; 5, a pin passing through the stem, lug and thimble and securing them together. In addition these parts are brazed in the usual manner. 6, the lower bearing cone resting on bridge 2; 7, a forwardly extending projection of bridge 2 constituting a rigid spring support; 8, rearward projections of the bridge constituting rigid spring supports; 9, the crown formed in the shape of a yoke; 10, a forward spring seat on the crown; 11, rear spring seats on the crown; 12, spring bolts, one of which passes through holes in each pair of spring supports and seats 7—10, 8—11, 8—11; the holes are of such diameter that the bolts fit freely to permit the necessary movement of the crown; 13, the heads of bolts 12, the head of the forward bolt resting against the end surface of spring support 7, so that the shank of the bolt points upward, and the heads of the rear bolts rest against the upper surface of spring supports 8 so that the shanks of the bolts point downward; 14, springs, one encircling each of the bolts; 15, double adjusting nuts engaging screw threads on the ends of the bolts, serving to adjustably compress springs 14 between them and spring seats 10 and 11; 16, a bearing pin passing through the lower end of thimble 4 and bridge 2, its ends projecting and forming pivotal bearings for the crown 9; 17, a set screw engaging pin 16 and holding it in place; 18, fork lugs on crown 9; and 19, the forks, the upper ends of which are slipped over the lugs 18 and secured in any suitable manner.

The forks 19 and crown 9 move pivotally as a unit upon pin 16 under the influence of inequalities in road surface, etc. The movement of the crown is cushioned in the specific construction shown by three helical springs which are pressed between nuts 15 and spring seats 10 and 11 and tend to return the crown to its normal position with spring seats 10 and 11 engaging spring supports 7 and 8 after it has been removed therefrom.

The arrangement of the rear springs resists any tendency of the forks to lateral play. If any one or possibly two of the springs break, the remaining spring or springs will usually serve to carry the load until the broken parts can be replaced. For this purpose, if necessary, the springs can be re-adjusted by means of nuts 15 to exert greater pressure. Breakage of all the springs or one of the spring supports or seats or other related parts will not usually result seriously, as the forks can at the utmost swing only until spring seats 10 or 11 encounter nuts 15. This movement is not in most cases sufficient to bring other parts of the vehicle than the wheels in contact with the road surface. This feature of safety provided by my invention is especially important when the fork is used in motor cycles and other relatively heavy vehicles.

I claim:

1. In a spring fork, the combination of a stem, a bridge piece secured thereto, spring supports on the bridge piece in front and rear of the stem, a crown pivoted to the stem, a forward spring seat on the crown resting above the forward spring support, a rear spring seat on the crown resting below the rear spring support, bolts, one passing loosely through holes in each pair of spring supports and seats and engaging the spring supports, nuts on the ends of the bolts, and springs encircling the bolts compressed between the nuts and the spring seats.

2. In a spring fork, the combination of a stem, a rigid bridge piece carried by the stem, a rearward projection on the bridge, a forward projection on the bridge, a yoke-shaped crown, the open ends of which lie below the rear projections and the closed end of which lies above the forward projection, springs, one engaging each rear end of the yoke and urging the ends against the bridge piece, and another spring engaging the forward part of the yoke and urging it against the forward projection of the bridge.

3. In a spring fork, the combination of a stem, a bridge piece having a tubular projection entering the stem, a tubular reinforcement engaging the inner surface of the stem and tubular projection, a crown, and a bearing pin passing through the bridge and reinforcement and forming a pivotal bearing for the crown.

4. As a new article of manufacture, a crown for spring forks consisting of a yoke-shaped piece of metal having a spring seat centrally of its closed end and a spring seat in each of the ends at the open side of the yoke, and having projections to which the forks may be secured.

5. In a spring fork, the combination of a stem, a bridge piece thereon, a crown pivoted to the bridge piece, a spring urging the crown to normal position in relation to the bridge, located substantially in front of the center of the crown axis, and two additional springs performing a similar function, one being located on each side of the center and to the rear of the crown axis, and forks connected with the crown.

6. In a spring fork, a stem, and a bridge piece carried thereby, a crown, forks carried by the crown, a pivotal connection between the approximate centers of the bridge piece and crown, the bridge piece and crown having coöperating forwardly and rearwardly projecting extensions, and yielding connections between the extensions of the bridge piece and crown.

7. In a spring fork, a stem, and a bridge piece carried thereby, a crown, a pivotal connection between the crown and bridge piece, and yielding connections between the crown and bridge piece, located forward and rearward of the pivotal connection.

8. As a new article of manufacture, a crown for spring forks, consisting of a yoke-shaped member having a central part adapted for connection with a bridge piece, said yoke having a spring seat located centrally of its closed end, and a spring seat at each of the ends of the open side of the yoke.

In testimony whereof I have affixed my signature in the presence of two witnesses.

MURRAY SCHENCK.

Witnesses:
 GEO. MITCHELL,
 E. M. JAMESON.